(12) United States Patent
Dentici et al.

(10) Patent No.: US 10,961,144 B2
(45) Date of Patent: Mar. 30, 2021

(54) METHOD AND APPARATUS FOR PROVIDING ULTRAPURE WATER

(71) Applicant: VWS (UK) LTD., High Wycombe (GB)

(72) Inventors: Ignazio Dentici, Walters Ash (GB); Michael Ball, High Wycombe (GB); Nigel Emery, Monks Risborough (GB)

(73) Assignee: VWS (UK) LTD., High Wycombe (GB)

( * ) Notice: Subject to any disclaimer, the term of this patent is extended or adjusted under 35 U.S.C. 154(b) by 8 days.

(21) Appl. No.: 16/336,335

(22) PCT Filed: Oct. 5, 2017

(86) PCT No.: PCT/GB2017/053012
§ 371 (c)(1),
(2) Date: Mar. 25, 2019

(87) PCT Pub. No.: WO2018/069674
PCT Pub. Date: Apr. 19, 2018

(65) Prior Publication Data
US 2019/0233314 A1 Aug. 1, 2019

(30) Foreign Application Priority Data
Oct. 13, 2016 (GB) ..................................... 1617347

(51) Int. Cl.
*C02F 9/00* (2006.01)
*C02F 1/20* (2006.01)
(Continued)

(52) U.S. Cl.
CPC .................. *C02F 9/00* (2013.01); *C02F 1/20* (2013.01); *C02F 1/32* (2013.01); *C02F 1/441* (2013.01);
(Continued)

(58) Field of Classification Search
CPC .......... C02F 9/00; C02F 1/441; C02F 1/4691; C02F 1/4695; C02F 1/20; C02F 1/32;
(Continued)

(56) References Cited

U.S. PATENT DOCUMENTS

2004/0118780 A1 6/2004 Willman et al.
2005/0103717 A1 5/2005 Jha et al.
(Continued)

FOREIGN PATENT DOCUMENTS

CN 202246314 U 5/2012
KR 20160123822 A 10/2016
(Continued)

OTHER PUBLICATIONS

Lee et al, "Recent transitions in ultrapure water (UPW) technology: Rising Role of reverse osmosis (RO)"; Desalination, vol. 399, Sep. 16, 2016, pp. 185-197.

(Continued)

*Primary Examiner* — Krishnan S Menon
(74) *Attorney, Agent, or Firm* — Faegre Drinker Biddle & Reath LLP (57) ABSTRACT

A method of providing ultrapure water from feed water containing hardness forming ions, comprising at least the steps of passing the feed water successively through: (i) providing a feed water stream containing hardness forming ions: (ii) passing the feed water stream through a reverse osmosis (RO) unit to remove at least some ionic contamination to provide a RO permeate water stream: (iii) passing the RO permeate water stream though a capacitive de-ionisation (CDI) unit to remove at least some of the ions to provide a post-CDI stream: and (iv) passing the post-CDI stream through an electrodeionisation (EDI) unit to remove at least some of the ions and carbon dioxide and to provide an ultrapure water stream for dispense or storage. In this (Continued)

way, the capacitive deionisation provides a wholly or substantially continuous process for removing a proportion of unwanted ions, especially the hardness forming ions, from the feed water prior to the use of electrodeionisation.

11 Claims, 3 Drawing Sheets (51) Int. Cl.
    *C02F 1/32*         (2006.01)
    *C02F 1/44*         (2006.01)
    *C02F 1/469*        (2006.01)
    *C02F 103/04*      (2006.01)

(52) U.S. Cl.
    CPC .......... C02F 1/4691 (2013.01); C02F 1/4695 (2013.01); *C02F 2103/04* (2013.01); *C02F 2201/4614* (2013.01); *C02F 2201/46135* (2013.01); *C02F 2209/001* (2013.01); *C02F 2209/003* (2013.01); *C02F 2209/005* (2013.01)

(58) Field of Classification Search
    CPC ........ C02F 2103/04; C02F 2201/46135; C02F 2201/4614; C02F 2209/001; C02F 2209/003; C02F 2209/005; C02F 2301/08
    See application file for complete search history.

(56) References Cited

U.S. PATENT DOCUMENTS

| 2008/0164209 | A1 | 7/2008 | Zacerkowny et al. |
| 2012/0085094 | A1 | 4/2012 | Davis et al. |

FOREIGN PATENT DOCUMENTS

| KR | 2017002047 | A | * | 1/2017 |
| KR | 20170002047 | A | * | 1/2017 |
| KR | 20170002047 | A | | 1/2017 |

OTHER PUBLICATIONS

UK IPO, Search Report for Application No. GB1617347.8, dated Feb. 24, 2017, 5 pages.
UK IPO, Search Report for Patent Application GB1716250.4 dated Mar. 26, 2018, 4 pages.

\* cited by examiner

METHOD AND APPARATUS FOR PROVIDING ULTRAPURE WATER

FIELD OF THE INVENTION

The present invention relates to a method and apparatus for providing ultrapure water, particularly but not exclusively ultrapure medical and laboratory water.

BACKGROUND

Water purification apparatus for use in laboratories and healthcare facilities are well known. Generally they involve the reduction and/or removal of contaminants and impurities to very low levels from a water source, as well as removing any impurities originating from within the apparatus itself. They typically use a variety of technologies that remove particles, bacteria, ionic species and organic substances and/or molecules. These technologies include, reverse osmosis, micro-filtration, deionisation, ultrafiltration, adsorption and UV irradiation.

One particular technology for purifying water to a very high level is electrodeionisation (EDI) as in U.S. Pat. Nos. 6,402,917 and 7,279,083, which applies an electric field across an ion exchange resin bed and uses ion-selective membranes to remove ionised and ionisable species from water. Water passes through one or more chambers filled with ion exchange resins held between cation and anion selective membranes, so that the unwanted ions migrate through the ion exchange resins to separate chambers under the influence of the electric field, and can be flushed to waste from the separate chambers.

Typically, the chambers are arranged in the form of a "stack" between the two main electrodes. However, the amount of ions that can be removed is a function of the applied electrical current and so the stack can easily be overloaded if there are high levels of salts in the water stream. Particulate and organic fouling can also reduce the performance of the stack. EDI stacks are particularly susceptible to the formation of a hard scale on the membranes, formed by the precipitation of sparingly soluble salts of 'hardness forming ions', such as calcium or magnesium. This results in a requirement that the feedwater to the EDI has to have a very low level of such dissolved hardness forming ions to maintain proper functioning. A typical specification requirement for an EDI unit such as the Evoqua Ionpure LX is <1 ppm as CaCO3, which equates to 0.4 ppm of calcium in the feedwater inlet to the EDI.

Thus, it is typical for water that is intended to be purified to the highest levels achievable by EDI, to be 'pre-conditioned' or 'pre-treated', by passing the feed water through one or more treatments, such as reverse osmosis to remove the majority of the ionic contaminants, and across or against the known 'sodium form' of ion exchange material to remove more or remaining hardness forming ions.

Reverse osmosis removes 90-99% of dissolved ions, but it does not remove the dissolved carbon dioxide that also needs removal to reach what is expected as 'ultrapure' quality water. Carbon dioxide is removed by electrodeionisation.

The sodium form or forms of ion exchange material is usually provided in one or more beds of ion exchange resins. In larger scale water treatment plants, these are located in regenerable 'beds' upstream of the reverse osmosis. In smaller scale units that are generally used in medical and laboratory applications, they are provided in cartridges or cylinders, that are located downstream of the reverse osmosis. The ion exchange cartridges are typically used for a period of time in a water purification unit, and then replaced at the end of their active life when the sodium active sites in the resins have been exchanged for hardness forming ions from the inlet water.

The lifetime and the disposal of such cartridges or cylinders are on-going concerns, especially if exhaustion occurs during a critical period requiring immediate supply of ultrapure water. There is also the need to obtain and have ready a replacement cartridge or cylinder, and then the safe environmental disposal of the exhausted cartridge. Like other machinery requiring periodic replacement parts, the need to pre-empt and then organise the replacement of exhausted cartridges can be an unwanted burden upon users, typically occurring at a time of immediate water demand. It may also or even require the organisation of specific personnel, such as engineers of the company or external service providers.

SUMMARY OF THE INVENTION

It is an object of the present invention to provide a simpler and less burdensome method and apparatus of providing ultrapure water reducing the amount of user or engineer interaction with the apparatus.

According to one aspect of the present invention, there is provided a method of providing ultrapure water from feed water containing hardness forming ions, comprising at least the steps of passing the feed water successively through:
(a) reverse osmosis; then
(b) capacitive deionisation; and then
(c) electrodeionisation.

In this way, the capacitive deionisation provides a wholly or substantially continuous process for removing a proportion of unwanted ions, especially the hardness forming ions, from the feed water prior to the use of electrodeionisation.

According to a second aspect of the present invention, there is provided a method of providing ultrapure water comprising at least the consecutive steps of:
(i) providing a feed water stream containing hardness forming ions:
(ii) passing the feed water stream through a reverse osmosis (RO) unit to remove at least some ionic contamination to provide a RO permeate water stream:
(iii) passing the RO permeate water stream though a capacitive de-ionisation (CDI) unit to remove at least some of the ions to provide a post-CDI stream: and
(iv) passing the post-CDI stream through an electrodeionisation (EDI) unit to remove at least some of the ions and carbon dioxide and to provide an ultrapure water stream for dispense or storage.

According to a third aspect of the present invention, a method of maintaining a capacitive de-ionisation (CDI) unit in a method for providing ultrapure water using reverse osmosis, capacitive deionisation, and electrodeionisation to a downstream device, comprising at least the steps of:
(i) receiving a signal from the downstream device that ultrapure water is required;
(ii) providing a feed water stream containing hardness forming ions:
(iii) passing the feed water stream through reverse osmosis (RO) to remove at least some ionic contamination and to provide a RO permeate water stream:
(iv) passing the RO permeate water stream though a capacitive de-ionisation (CDI) unit to remove at least some of the hardness forming ions by charging to provide a post-CDI stream:

(v) passing the post-CDI stream through electrodeionisation (EDI) to remove at least some of the ions as removed ions, and to remove carbon dioxide, to provide an ultrapure water stream to the downstream device:
(vi) receiving a signal from a downstream device that purified water is no longer required:
(vii) passing more feedwater through RO and the CDI unit so that the CDI unit discharges the removed ions of step (iv) in a CDI discharge stream; and
(viii) directing the CDI discharge stream away from EDI.

According to a fourth aspect of the present invention, there is provided a water treatment apparatus able to provide ultrapure water, comprising at least in sequence:
(a) a reverse osmosis unit; then
(b) a capacitive deionisation unit; and then
(c) an electrodeionisation unit.

According to a fifth aspect of the present invention, there is provided a water treatment unit for water containing hardness forming ions, comprising successively a reverse osmosis (RO) unit to remove at least some ionic contamination, a capacitive de-ionisation (CDI) unit able to remove at least some of the hardness forming ions, and an electrodeionisation (EDI) unit to remove at least some of the hardness forming ions and carbon dioxide, and to provide an ultrapure water stream, for dispense or storage.

BRIEF DESCRIPTION OF THE DRAWINGS

The present invention will now be further described by way of example only and with reference to the accompanying drawings in which:

FIG. 2 is a schematic view of a method of providing ultrapure water according to a second embodiment of the present invention; and.

DETAILED DESCRIPTION

The present invention provides a method of providing ultrapure water from feed water containing hardness forming ions comprising at least the steps of passing the feed water successively through:
(a) reverse osmosis; then
(b) capacitive deionisation; and then
(c) electrodeionisation.

Reverse Osmosis (RO) is a well known technology in the art, and uses selective permeation through thin membranes. The membranes remove water contaminates that are more than 1 nm diameter, and typically remove over 90% of ionic contamination, most organic contamination, and nearly all particulate contamination. Reverse Osmosis does not remove dissolved gases such as carbon dioxide, and has lower rejection of small non ionised molecules such as silica or boron.

During reverse osmosis, feed water is usually passed over a RO membrane under pressure, typically between 4-15 bars, in a cross-flow fashion. RO membranes are typically a thin film polyamide, and they are stable over a wide pH range. Typically 15-30% of the feed water passes through the membrane as permeate, and the remainder exits the membrane as a "concentrate" that contains most of the salts, organics and essentially all particulates.

The RO membranes can be provided in a number of forms, but are typically wound to form an RO 'module', which is usually in the form of a cylinder, and which can be housed in a suitable cylindrical housing generally having a water inlet, a permeate outlet for subsequent treatment, and a concentrate outlet for disposal.

An RO unit may comprise one or more parts, sections or portions, providing at least one RO pathway, optionally more RO pathways. Each pathway may be provided by a module, cartridge or cylinder, optionally operating in series, parallel or both. Optionally the concentrate provided by one or more of the pathways can be the inlet feed to one or more other pathways, and the or each permeate can be collected to provide a final permeate water output or stream from the RO process and/or unit. Optionally the permeate from one set of modules can be passed to the feed of a second set of modules in a twin-pass arrangement.

The feed water useable in the present invention can be any potable feed water typically up to 2000 µS/cm. The feed water containing hardness forming ions may be provided from any suitable source, including 'tap' water or similar water provided from a 'mains' source typically remote from the location of the present invention.

The term "hardness forming ions" as used herein refers to ions of salts 'sparingly' soluble in water, such as but not limited to calcium or magnesium. Such salts include calcium and/or magnesium carbonate, bicarbonate, sulfate, hydroxide and borates. Silica can also form hardness forming salts. The Langelier Saturation Index (LSI) provides one well known indicator of the degree of precipitation and saturation of water with respect to calcium carbonate, and this and known solubility product data can be used to judge what are the hardness forming ions in a water stream U.S. Pat. No. 6,296,751 B1 also discusses the LSI, and the issues of precipitation of various known salts in or during electrodeionisation.

Optionally, the feed water is pre-treated prior to the reverse osmosis. The pre-treatment can comprise one or more processes and/or units, including but not limited to filtration through one or more filtration media, such as activated carbon, and the use of micro-porous filters. The pre-treatment is intended to particularly remove any chlorine and chloramine which can affect subsequent processes or treatments in water purification by such means as oxidation of the membranes or resins. Other water pre-treatment processes and units are known in the art, and the present invention is not limited by the nature, status or form of the pre-treatment.

Optionally, the RO permeate water undergoes degassing. Optionally the reverse osmosis permeate is passed through a degassing membrane to partially remove gases including carbon dioxide from the permeate. A degassing membrane or membrane contactor allows water to flow on one side of a hydrophobic membrane with a sweep gas and/or a vacuum on the other, to allow gases to pass through the pores in the membrane based on the partial pressure of the gases. A membrane contactor may consist of a housing containing sets of hydrophobic fibres through which the water passes with the sweep gas and/or vacuum applied to the outer surface of the membrane within the housing, the gases being removed from the liquid through the membrane pores into the sweep gas/vacuum and then drawn or blown out of the housing to atmosphere.

Capacitive deionisation (CDI) is a process which passes a stream of water through one or more pairs of spaced apart electrodes having a high surface area and low electrical resistance, and which is able to remove ions from the water electrostatically for capture by the electrodes.

Examples of CDI are known such as described in U.S. Pat. Nos. 5,192,432 and 5,425,858. The inlet water generally flows between electrodes, or through the electrodes themselves, or between or around multiple electrodes either located in a module of a single or multiple chambers. All of these arrangements have different advantages, but they all still relate to providing a purified water stream wherein ions have been removed.

The action of removing ions including hardness forming ions from the water in the CDI is typically termed 'charging', and the operational time therefor is typically termed 'charging time'. Similarly, the action of subsequently removing the same ions from the CDI electrodes (to allow ion collection) is typically termed 'discharging'. Compared with 'charging', the electrodes can be discharged relatively quickly by shorting or current reversal during further water flow, to discharge the so-collected ions from the electrodes into such water as a discharge water stream, (which can be passed to via discharge outlet to a drain, or for recirculation to an upstream process and separate from the passageway for the purified water previously going to the electrodeionisation). The time therefor is typically termed 'discharging time'. The collective time for both the charging and the discharging is typically termed the operational time (of the CDI or CDI unit)

A CDI unit has one inlet and one outlet. The CDI process may be provided by a single unit either operating in a charging mode or discharging mode, or by more than one CDI unit able to work 'in tandem' or the like, such that one of more of the CDI units can be charging, whilst one or more different CDI units are simultaneously discharging, with switching when required between the different modes. Where charging and discharging times are typically similar, it is common to operate two CDI units in a 'duplex mode', such that one unit is operated in a charging mode while the other is operated in a discharging mode, with frequent switching of modes so that a continuous or near continuous outflow of purified water is produced. However using two or more units simultaneously clearly requires additional water lines, electrics and control operations compared with using a single CDI unit.

The present invention may include one or more of the group comprising: ports, inlets, outlets, valves, gates, switches, tubing; for the passageway of various water streams into, out of, and between, various parts of the apparatus, and to carry out various steps of the methods, of the present invention Optionally, the apparatus and method of the present invention further comprise one or more operating valves, for discharging the capacitive deionisation into water, and for diverting the discharge water stream exiting the capacitive deionisation away from the electrodeionisation. As this discharge water stream has passed through treatments prior to the capacitive deionisation it may be possible to return the water upstream of the reverse osmosis, thus reducing the water consumption of the apparatus.

As the Reverse Osmosis (RO) typically removes over 90% of ionic contamination, the CDI requires relatively little discharging time. By way of example only, a desired feedwater flow rate of 0.5 litre/min through the capacitive deionisation after the reverse osmosis may only require discharging once every 15, 30 or 60 minutes.

In one embodiment, discharging time of the capacitive deionisation is <20% of the operating time of the capacitive deionisation.

In another embodiment, discharging time of the capacitive deionisation is ≤10% of the operating time of the capacitive deionisation.

Once CDI electrodes have absorbed their maximum capacity of ions they are 'full' or 'exhausted' and will remove no further ions. In prior intermittent or non-continuous uses of CDI, it has been acceptable to wait until the electrodes are 'full' in this way, before considering the need for any discharge. However, in a method of providing ultrapure water to the demand of users, it is not desired to reach a situation where the CDI electrodes are completely full, or possibly even substantially full, and therefore not able to provide any further removal of ions to meet immediate additional ultrapure water demand.

Optionally, the method of the present invention further comprises the step of discharging the capacitive deionisation when there is no demand for the ultrapure water, further optionally until the capacitive deionisation is fully discharged.

Optionally, the method of the present invention can include initiation of the CDI charging when a signal is received that purified water is required downstream of the CDI, such as via a sensor, device or other apparatus, optionally being before, in, or after any reservoir. Alternatively a short discharging of <20%, preferably ≤10%, of the charging time may be carried out prior to the initiation of use of the CDI to remove the hardness forming ions, i.e. charging.

Optionally, the method of the present invention can include stopping the charging of the CDI when a signal is received that purified water is no longer required 'downstream' of the CDI as defined hereinabove, and starting discharging of the CDI.

In this way, the method of the present invention is able to ensure that it can provide any immediate ultrapure water demand by discharging the capacitive deionisation during periods of 'non-demand'.

By way of example only, a desired feedwater flow rate of 0.5 litre/min through the capacitive deionisation after the reverse osmosis may only require discharging less than 10 or 5 minutes per hour of charging time, and it is unexpected for ultrapure water demand to be continuous for more than 30 or 60 minutes.

CDI can purify water without oxidation-reduction reactions, as the electrodes electrostatically absorb and desorb contaminants, typically in the electrodes' macropores and mesopores. During the charging or absorption part of the cycle the water is purified, while during the discharging or desorption part the water becomes more concentrated. As purification is intermittent, CDI is often operated with two units modules in a duplex mode as discussed hereinbefore, one module producing purified water while the other module is producing concentrated water. This allows the pair of modules to maintain a flow of post-CDI water to downstream processes.

One particular form of CDI is described in U.S. Pat. No. 6,709,560B2 which is incorporated herein by way of reference. U.S. Pat. No. 6,709,560B2 describes a combination of CDI electrodes and charge barriers, such as ion-exchange membranes placed in front of one or both of the electrodes, typically both electrodes. The ion-exchange membranes have a high internal charge due to having bound groups such as sulfonate or quaternary amines, which allow easy access for one type of ion (the counter ion) and block access for the ion of equal charge sign (the co-ion). This form of capacitive deionisation is now commonly referred to as membrane capacitive deionisation (MCDI).

The use of ion-exchange membranes can significantly improve the performance of the CDI unit or CDI process depending upon the ions to be removed, in terms of salt absorption charge efficiency and energy consumption.

EP1431250A1 also describes the use of a CDI process in relation to the purification of water, but only for the treatment of concentrate streams from a reverse osmosis unit that would otherwise have been sent to a drain. The CDI module has an inlet in fluid communication only with said concentrate outlet of a reverse osmosis unit, and which cannot therefore assist any other part of the water purification.

Optionally, the purified water provided by CDI undergoes ultra-violet (UV) irradiation. Ultra-violet light of the correct wavelength is well known as being a bactericide. Typically the UV source is a low pressure mercury lamp, and typically the radiation has a wave length of 254 nm, optionally also 185 nm. The shorter wavelength can oxidise organics as it breaks larger organic molecules into smaller ionised components for subsequent removal by ion exchange.

Electro-deionisation or EDI is described herein above. EDI can purify water to a very high level, and can also remove ionisable species such as silica and carbon dioxide from the water.

After EDI, the present invention provides a supply of ultrapure water ready for use and dispense, generally through one or more user outlets, such as a dispense tap or 'point of use' apparatus or location. Optionally, the ultrapure water can be provided for distribution through one or more water distribution apparatus or networks.

Where immediate use of the ultrapure water is not desired, optionally at least some of the ultrapure water is collected in a reservoir. The term "reservoir" as used herein includes any unit, vessel or location able to collect ultrapure water for temporary storage and subsequent availability to a user. As delivery can be enhanced by a pump connected to the outlet of the reservoir the outlet flow rate may be at a higher rate than would be available if taking water directly from the make up stream.

As the storage of ultrapure water can lead to its reduced purity, optionally the present invention includes a re-circulation circuit with a reservoir downstream of the CDI and the post-CDI water in the reservoir is recirculated through the electrodeionisation process, step or unit until it is required. Optionally, at least some of the ultrapure water is also re-circulated through a UV irradiation unit. Optionally, the re-circulation is provided by a re-circulation circuit, which comprises a circuit for passing water stored in the reservoir through the EDI, a UV unit, and passed a tap or point of dispense, and optionally back into the reservoir if still not required.

Optionally, the present invention further comprises a downstream recirculation circuit for recirculating at least some of the ultrapure water in the reservoir through a UV irradiation unit, a separate or second electrodeionisation unit, and/or an ultra-filtration unit.

One or more EDI units may be included in the make up stream with one or more separate EDI units in the re-circulation circuit.

Level control apparatus in the reservoir can be used to stop and start the flow and processes in the line from the feedwater to the re-circulation circuit, often referred to as the make-up line.

Optionally, the water treatment method or apparatus comprises one or more sensors, such as flow sensors to monitor one or more parameters, or water quality sensors, such as conductivity measurement or specific ion determination sensors. The present invention may use different sensors at different stages of the method and/or units or locations in the apparatus.

Optionally, the present invention uses one or more water quality sensors, typically in advance of, or following discharge from, or both of, one or more of the different stages of the method and/or units or locations in the apparatus.

In one embodiment, there is a sensor prior to the capacitive deionisation unit, and data from the sensor is used to control the voltage or current applied to the capacitive deionisation unit.

In another embodiment, the method further comprises the step of locating a sensor prior to the capacitive deionisation, and using data from the sensor to control the voltage or current applied to the capacitive deionisation.

In another embodiment, there is a sensor prior to the electrodeionisation unit, and data from the sensor is used to control the voltage or current applied to the electrodeionisation unit.

In another embodiment, the method further comprises the step of locating a sensor prior to the electrodeionisation, and using data from the sensor to control the voltage or current applied to the electrodeionisation.

In another embodiment, there is a sensor downstream from the capacitive deionisation unit, and data from the sensor is used to control the voltage or current applied to the capacitive deionisation unit. Such a sensor is preferably immediately or directly, downstream from the capacitive deionisation unit and prior to the EDI unit.

In another embodiment, the method further comprises the step of locating a sensor downstream from the capacitive deionisation, and using data from the sensor to control the voltage or current applied to the capacitive deionisation. Such a sensor is preferably immediately or directly, downstream from the capacitive deionisation unit and prior to the EDI unit.

In another embodiment, there is a discharge outlet after the capacitive deionisation for a discharge water stream created during discharging, the discharge outlet includes a sensor to control the discharge operation of the capacitive deionisation unit.

Thus, the present invention extends to a method of maintaining a CDI unit able to provide ultrapure water to a downstream device in a manner described herein, comprising at least some of the steps and streams described herein. The downstream device may be any suitable unit or apparatus downstream of the CDI, including but not limited to one or more of the groups comprising: a reservoir, a user outlet, a passageway.

Generally, the present invention can provide a water treatment unit comprising the apparatus defined herein, and including successively a reverse osmosis (RO) unit to remove at least some ionic contamination, a capacitive de-ionisation (CDI) unit able to remove at least some of ions, and an electrodeionisation (EDI) unit to remove at least some of the carbon dioxide and to provide an ultrapure water stream for dispense or storage.

Optionally, the water treatment unit further comprises one of the group comprising: a pre-treatment unit prior to the RO unit(s), a UV unit, and a re-circulation circuit.

Optionally, the method and water treatment unit of the present invention include a water recirculation circuit from a reservoir, and including one or more of the group comprising: UV irradiation, a second or separate electrodeionisation, ultra-filtration, and one or more user dispense outlets, optionally all four.

In a first particular embodiment, the present invention provides a method comprising at least the consecutive steps of:

(i) providing a feed water stream containing hardness forming ions:

(ii) passing the feed water stream though a pre-treatment unit to remove at least some particulate matter from the feed water and to provide a pre-treated water stream;

(iii) passing the pre-treated water stream through a reverse osmosis (RO) unit to remove at least some ionic contamination to provide a RO permeate water stream:

(iv) passing the RO permeate water stream though a single capacitive de-ionisation (CDI) unit to remove at least some of ions to provide a post-CDI stream:

(v) passing the post-CDI stream through an electrodeionisation (EDI) unit to remove at least some of the ions and carbon dioxide and to provide a first ultrapure water stream for dispense or storage;

(vi) passing the first ultrapure water stream through an UV irradiation unit to provide a second ultrapure water stream, either for dispense or for storage in a reservoir; and (vii) re-circulating any water in the reservoir around a re-circulation circuit comprising the electrodeionisation and a UV irradiation unit.

In a second particular embodiment, the present invention provides a method comprising at least the consecutive steps of:

(i) providing a feed water stream containing hardness forming ions:

(ii) passing the feed water stream though a pre-treatment unit to remove at least some particulate matter from the feed water and to provide a pre-treated water stream;

(iii) passing the pre-treated water stream through a reverse osmosis (RO) unit to remove at least some ionic contamination to provide a RO permeate water stream:

(iv) passing the RO permeate water stream though a degassing unit to provide a degassed stream;

(v) passing the degassed stream through a single capacitive de-ionisation (CDI) unit to remove at least some of ions to provide a post-CDI stream:

(vi) passing the post-CDI stream through a first electrodeionisation (EDI) unit to remove at least some of the ions and carbon dioxide and to provide a first ultrapure water stream;

(vii) passing the first ultrapure water stream to a reservoir;

(viii) passing ultrapure water in the reservoir through an UV irradiation unit, a second electrodeionisation (EDI) unit, and an ultra-filtration unit, to provide a further ultrapure water for dispense or storage in the reservoir; and (ix) re-circulating any water in the reservoir around a re-circulation circuit comprising, the UV irradiation unit, the second electrodeionisation unit, and the ultra-filtration unit.

The present invention is able to provide ultrapure water having a resistivity of >15 MΩ-cm, optionally >18 MΩ-cm.

Figure 1:
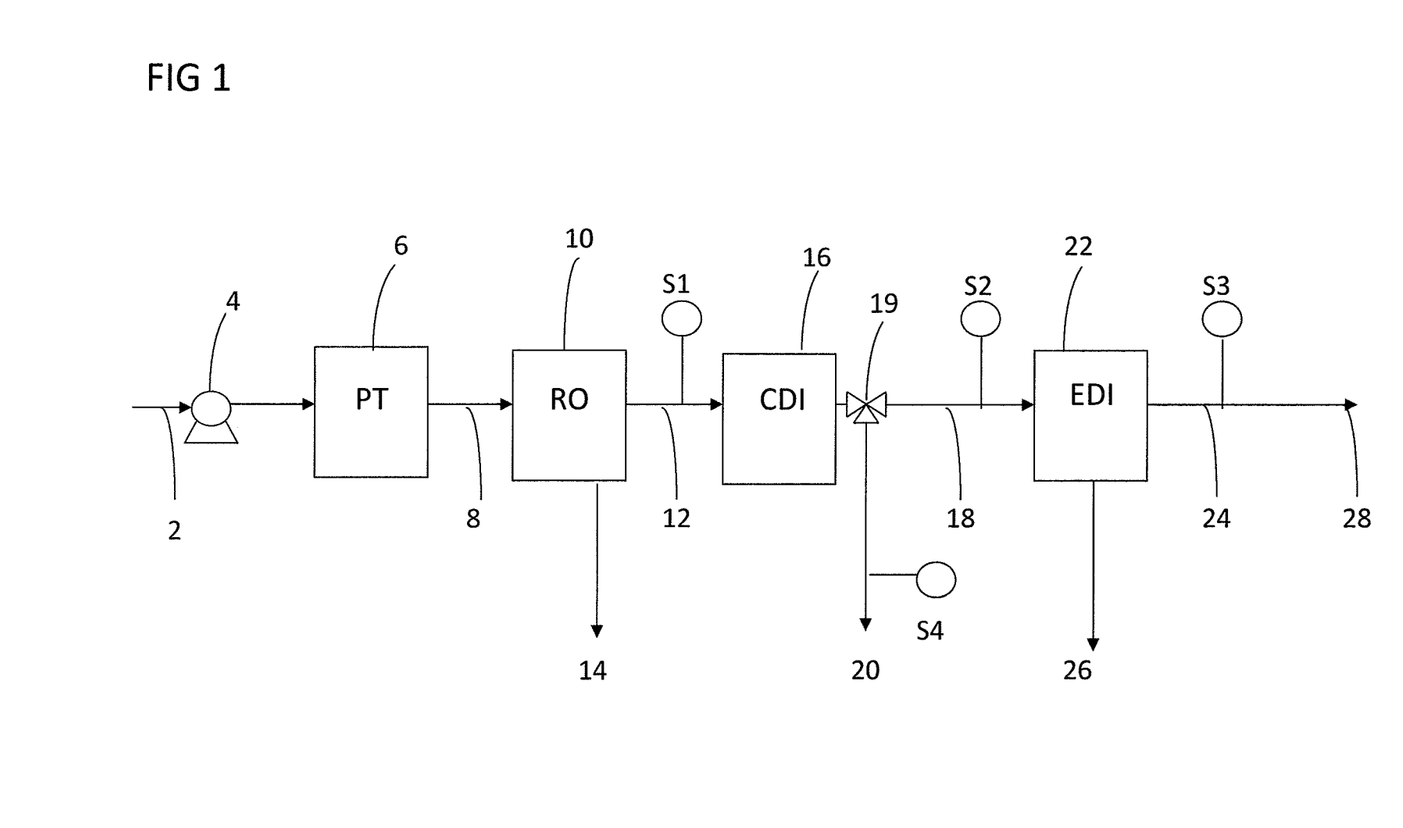
FIG. 1 is a schematic view of a method of providing ultrapure water according to a first embodiment of the present invention.

Referring to the drawings, FIG. 1 shows a schematic plan of a method and apparatus for producing ultrapure water from feed water containing hardness forming ions. A source of feed water, such as a tap or other mains supply, provides a feed water stream 2 which can be pressurised for progression though the apparatus by an optional boost pump 4 prior to entry as a feed inlet into a pre-treatment unit 6.

The pre-treatment unit 6 may comprise one or more filters or filter media, able to reduce at least the particulates in the feed water, and optionally one or both of chlorine and chloramine which can affect subsequent processes or treatments in water purification.

An outlet from the pre-treatment unit 6 provides a pre-treated water stream 8 into a reverse osmosis (RO) unit or location 10 having suitable inlet(s) and outlet(s), optionally comprising one or more RO modules or cartridges, and able to remove the majority of salts, organics and any further particulates in the pre-treated water stream 8.

The RO unit 10 provides a RO permeate water stream 12, and a waste stream 14. The RO permeate quality can be monitored by a first in-line water quality sensor S1, prior to providing the inlet stream into a capacitive deionisation (CDI) unit or module or process 16 having suitable inlet(s) and outlet(s). Other sensors such as for flow rate may also be located in the RO permeate water stream line 12, and the values from the sensors can be used to assist in the control of the CDI unit 16, for example by controlling the voltage or current applied to the CDI unit.

For example, if water quality and/or flow sensors indicate that there is an increase in the rate of ions entering the capacitive deionisation unit or module by a certain value or amount, say 25%, then the voltage or current could be increased by the same or a similar value or amount, i.e. 25%.

The CDI unit 16 removes the majority of unwanted ions, particularly calcium and magnesium ions, which can be detrimental to the EDI process. Unlike when using sodium form ion exchange resins or beads, these unwanted ions are not replaced by another ion, but are completely removed from the water to be treated, reducing the subsequent ion removal requirement in the EDI process, whilst still removing the risk of hardness precipitation within the EDI.

As the feedwater has been pre-treated by reverse osmosis, the ionic content of the CDI feed stream is reduced to being in the range of 1% to 10% of the ionic content entering the reverse osmosis. This allows the CDI electrodes to operate for much longer periods before they have reached their 'capacity'. Along with the relatively rapid discharging time required, having longer periods of charging time in the overall operation time of the CDI unit removes the necessity to operate two CDI units in a duplex mode, and a continuous outflow of purified water can be maintained for a time required by a downstream process or apparatus.

For example the discharge may be ended when the discharge water quality as measured by S4 approaches that of the inlet water as measured by S1. For example this may be when the conductivity measured at S4 is only 25% higher than that measured at S1.

Alternatively or additionally the controls may maintain a log of the integral amount of ions entering the capacitive deionisation unit and determine that a similar amount has been discharged as was accumulated. Discharge may not need to be operated every time demand is ceased, either by lack of demand at user outlet or dispense point 28, or the reservoir 32, if the integral amount of ions entering the capacitive deionisation unit since the last discharge is only a small proportion, e.g. <25% or <50%, of the amount of ions that could be taken up during a full charging of the unit.

This means that during demand for ultrapure water the CDI unit 16 is able to run wholly or substantially continuously, with only occasional regeneration or rejuvenation of the electrodes in the CDI unit 16. Regeneration is possible by using a short period of shorting or reverse polarity to discharge the collected ions into a suitable discharge water outlet 20 via a valve 19 post CDI. The quality of the discharge stream in the discharge outlet 20 can be monitored by a sensor S4 to control when discharge is no longer required.

Because the CDI occurs downstream of the RO (which is able to remove at least the majority of the hardness forming ions from the water stream), the discharging or regeneration can be carried out for a shorter time than the charging time, for example <20%, or preferably 10%, of the charging time.

The method and apparatus of the present invention can include a control or operating system able to determine the switching of the CDI from its normal charging operation to the discharging operation at times when there is no ultrapure water demand, (or sufficient ultrapure water in the reservoir to meet short term expected demand).

As the discharge can be carried out at a time when downstream or post-CDI water is not required, the CDI step or process may provide an effectively continuous operation with minimal interruption or down time, and post-CDI water can be produced whenever it is required.

The use of CDI provides a flatter and more predictable OPEX over a variety of usage/feed water qualities as it requires less user intervention as it does not require any change of sodium form' ion exchange resin cartridges or cylinders, providing a simpler and less burdensome method and apparatus of providing ultrapure water, in particular avoiding the on-going concern about the lifetime of cartridges or cylinders and the need to obtain and have ready a replacement cartridge or cylinder.

By avoiding the need for cartridge replacement, the use of CDI also provides the further benefit of lower environmental impact, by avoiding the need to dispose of exhausted ion exchange cartridges, etc.

The use of CDI 16 also reduces the 'work load' of the subsequent electrodeionisation process, step or stage, thereby reducing the size or power requirements of the EDI in the post or downstream CDI treatment. and may prolong the life of the EDI prior to servicing or replacement.

The CDI unit 16 provides a post-CDI stream 18 which provides an inlet stream into an EDI unit or process 22. The post CDI stream quality can be monitored by a second in-line water quality sensor S2, prior to providing the inlet stream into the EDI unit or module or process 22, having the required inlet(s) and outlet(s).

Other sensors such as for flow rate may also be located in the post-CDI line and the values from the sensors can be used to assist in the control of the EDI unit 22, for example by controlling the voltage or current applied to the EDI unit.

For example if water quality and/or flow sensors indicate that there is an increase in the rate of ions entering the EDI unit or module by a value or amount, such as by 25%, then the voltage or current could be increased by the same or a similar value or amount, i.e. by 25%

As described herein, the EDI unit 22 provides the highest continuous refinement of the water, to provide an ultrapure water stream 24 along with a waste stream 26 therefrom. The ultrapure water 24 can be provided to an outlet or dispense point 28, whose quality is monitored by a third water quality sensor S3.

FIG. 1 shows all the requirements for a method of maintaining a capacitive de-ionisation (CDI) unit able to provide ultrapure water to a downstream device, comprising at least the steps of:
(i) receiving a signal from the downstream device that ultrapure water is required;
(ii) providing a feed water stream containing hardness forming ions:
(iii) passing the feed water stream through a reverse osmosis (RO) unit to remove at least some ionic contamination and to provide a RO permeate water stream:
(iv) passing the RO permeate water stream though the CDI unit to remove at least some of the hardness forming ions by charging to provide a post-CDI stream:
(v) passing the post-CDI stream through an electrodeionisation (EDI) unit to remove at least some of the ions as removed ions, and to remove carbon dioxide, to provide an ultrapure water stream to the downstream device:
(vi) receiving a signal from a downstream device that purified water is no longer required:
(vii) passing more feedwater through the RO unit and the CDI unit so that the CDI unit discharges the removed ions of step (iv) in a CDI discharge stream; and
(viii) directing the CDI discharge stream away from the EDI unit.

FIG. 1 also shows water treatment apparatus for achieving such a method of maintaining a CDI unit.

Figure 2:
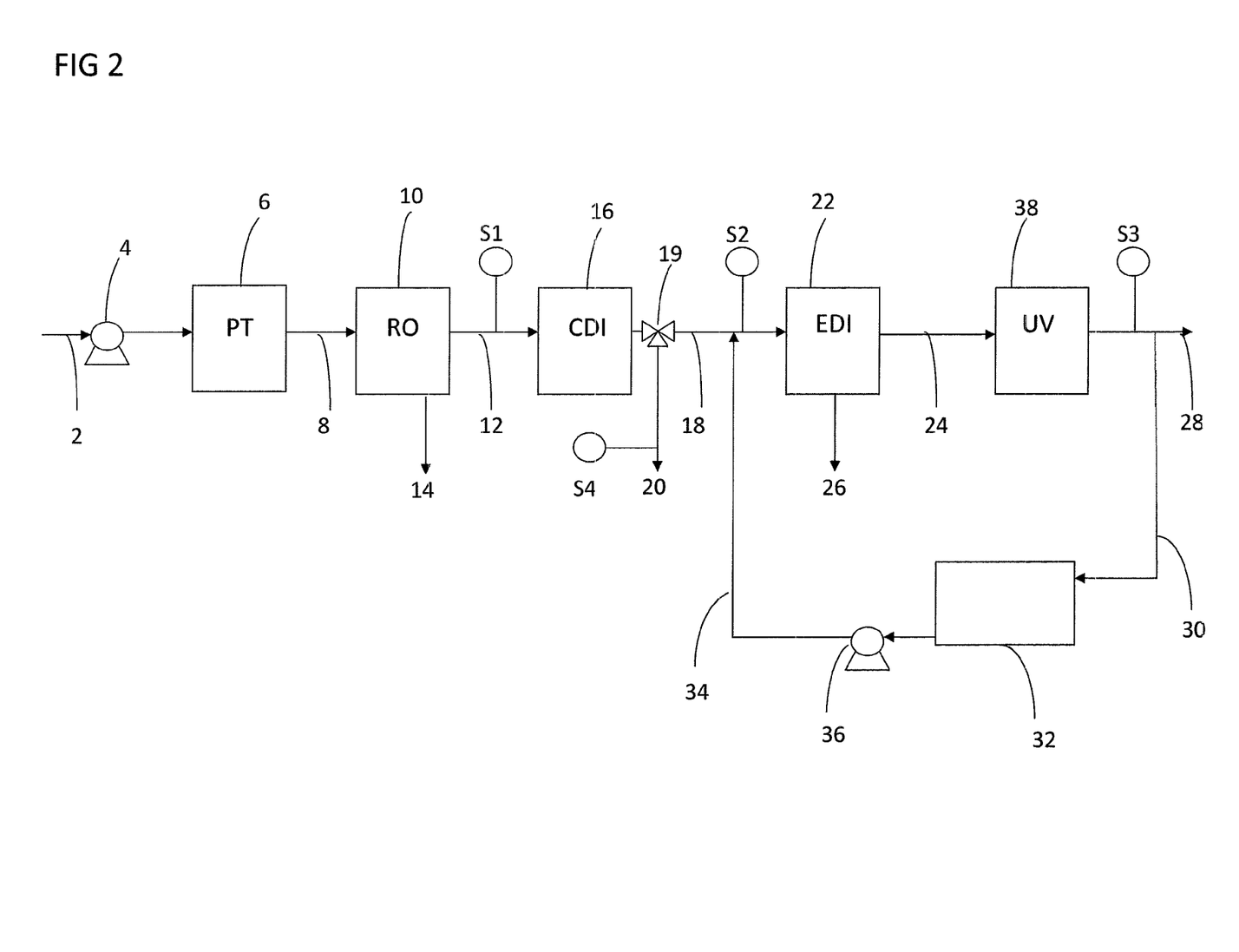

FIG. 2 shows a schematic plan of a method and apparatus for producing ultrapure water from feed water where the ultrapure water 26 is not immediately required.

FIG. 2 includes a first re-circulation circuit 30. When there is no or limited demand for ultrapure water to be dispensed from the outlet, ultrapure water can be directed by means (not shown) to the re-circulation circuit. The re-circulation circuit comprises a reservoir 32 and a return stream 34 having a re-circulation pump 36 therein, able to re-circulate the water in the re-circulation circuit 30 back into the EDI unit 22 to maintain the water quality desired for the ultrapure water 24 in a manner known in the art, and not further described herein. Bacterial control of the ultrapure water is carried out by a UV purification unit 38 in the recirculation loop. UV purification units are known in the art and not further described herein.

The sequence of components from the feed water stream 2 to the point where the partially purified water enters the re-circulation circuit is known as the make up line or make up stream. Level controls apparatus (not shown) in or on the reservoir 32 can be used to control, by control means known in the art, the flow of water and operation of the processes, including the CDI, in the make up line. The CDI can be discharged to a drain via valve 19 and the discharge water outlet 20 when the reservoir 32 becomes full.

The recirculation loop may allow dispense of water at the outlet 28 at a rate higher than that produced by the CDI unit 16. This allows greater use of the CDI in circumstances where ultrapure water is only required infrequently and allows the components in the make up stream to be smaller as they can operate for longer at a lower flow rate.

Figure 3:
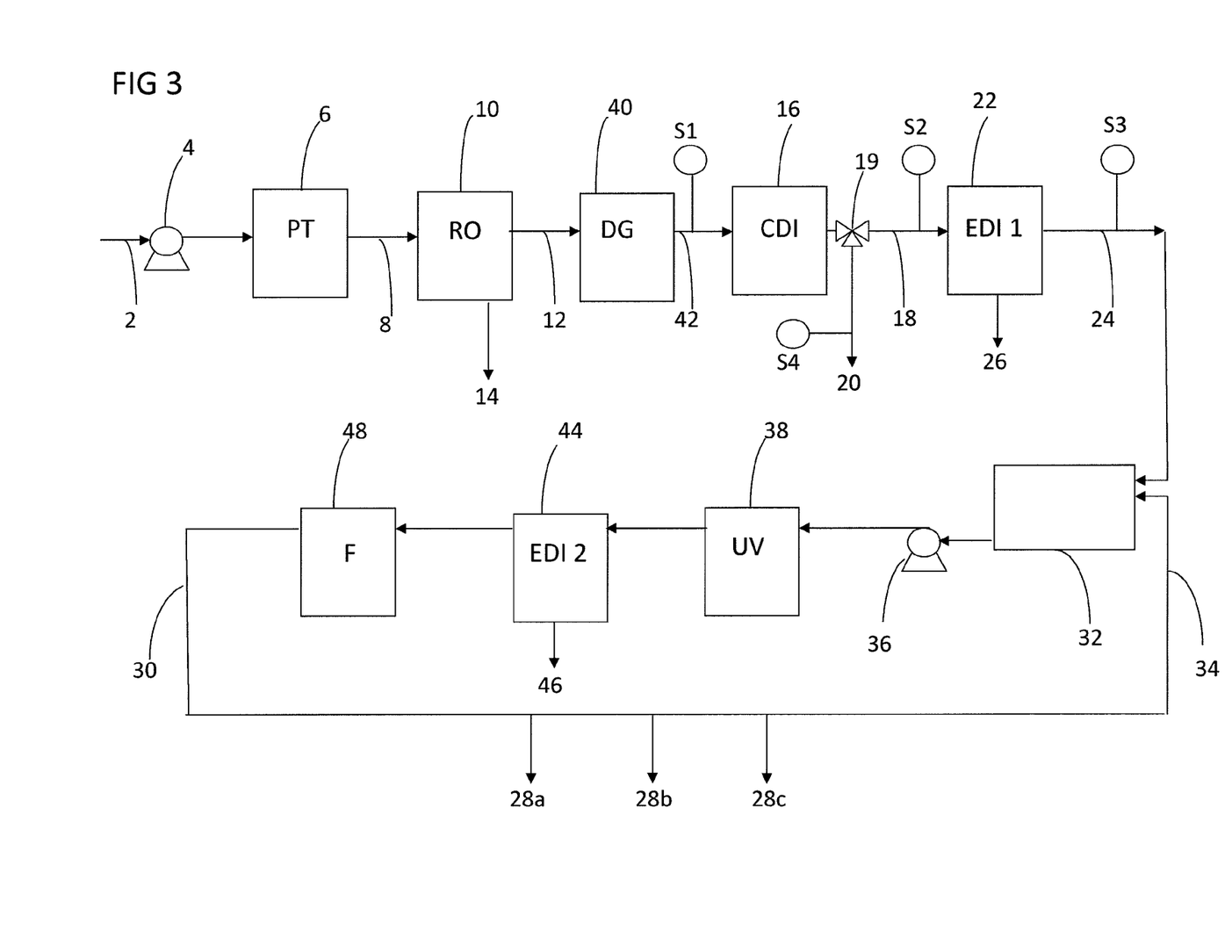
FIG. 3 is a schematic view of a method of providing ultrapure water according to a third embodiment of the present invention.

FIG. 3 shows a schematic plan of a method and apparatus for producing ultrapure water from feed water with reverse osmosis, capacitive deionisation and electrodeionisation units in the make up line, and a second electrodeionisation unit in a second re-circulation loop.

FIG. 3 shows a water treatment method and apparatus comprising pre-treatment 6, reverse osmosis 10, a degassing membrane 40, capacitive deionisation 16 and electrodeionisation 22, being and/or operating in the same or similar manner to as described hereinbefore. The purified water exiting the electrodeionisation unit 16 is passed to the reservoir 32.

Level control (not shown) in the reservoir 32 interacts via a controller (not shown) such that when the level in the reservoir 32 falls below a pre-determined level, the pump 4 is activated and the feed water stream 2 containing the hardness forming ions is passed through the pre-treatment 6, reverse osmosis 10, degasser 40, capacitive deionisation 16 and electrodeionisation 22 to reservoir 32, until such time that the level control indicates that the reservoir 32 is full. If the capacitive deionisation 16 becomes 'full' (of ions) before the reservoir 32 becomes full of purified water, the capacitive deionisation 16 discharges via valve 19 and the discharge water outlet 20 away from the electrodeionisation 22, until it is sufficiently discharged, at which point charging and flow to reservoir 32 can be re-started.

Optionally, a rinse to drain via the capacitive deionisation discharge water outlet 20 may be included when the method initiates to remove hardness forming ions that may have diffused into the downstream or 'product' side of the reverse osmosis membrane 10, or organic molecules that may have leached from any plastic components. This allows complete discharge of the capacitive deionisation unit 16, providing for optimum purification when water is passed to the reservoir 32. This also allows time for the sweep gas or vacuum in any degassing membrane 40 to reach its operating conditions.

The re-circulation loop 30 contains a pump 36, an ultraviolet irradiation unit 38, a separate or second electrodeionisation unit 44 (with a concentrate discharge stream 46) and a final micro- or ultra-filtration unit 48, to guarantee the ultra-pure water quality passed to one or more user outlets or downstream devices 28a, 28b, 28c, with non required water being returned to the reservoir via return stream 34.

EXAMPLE

Apparatus as shown in FIG. 3 was operated with a pre-treatment of a 10 inch spun bonded depth filter and a 10 inch 5 micron carbon filter; three Dow Filmtec 1812 reverse osmosis membranes; a Membrana Liqui-cell MiniModule degassing module; an Idropan 2.5 capacitive deionisation module; and an EDI as described in U.S. Pat. No. 2,349,648, feeding a 20 litre reservoir, with level controls that would request water from the feed stream when the level in the reservoir was below 14 litres. The re-circulation loop was fitted with a Lighttec 185/254 nm UV; an EDI as in U.S. Pat. No. 7,279,083 and a Mitsubishi Rayon Sterapore 0.05 micron filter.

Ultra-pure water was re-circulated in the re-circulation loop and 114 litres per day of ultra-pure water was taken off from the re-circulation loop in five hourly sections. This caused the level in the reservoir to drop, and when it reached 14 litres a signal was sent to the controller to initiate the make up stream. On initiation the capacitive deionisation unit was set to discharge, and the initial water from the reverse osmosis modules was passed through the discharging capacitive deionisation unit to drain for 90 seconds. This allowed the water that had contaminated from leaching and diffusion to be passed to drain and allowed all the processes to reach optimal performance prior to passing part purified water to the EDI and reservoir. The capacitive deionisation module was then operated in charge mode for 15 minutes, with water directed to the EDI and reservoir. If, due to usage from the re-circulation loop, the level in the reservoir had not reached 20 litres after 15 minutes, the capacitive deionisation unit was switched to discharge for 90 seconds and the discharge water was passed to drain. After the 90 seconds discharge, charging was re-started with corresponding passage of water to the reservoir for another cycle of maximum time of 15 minutes.

As the water passed through the apparatus, the water was purified from an initial conductivity of 600 µS/cm to 20 µS/cm after the reverse osmosis membranes, and to 4.6 µS/cm after the capacitive deionisation unit, with a resistivity of 10 MΩ·cm (conductivity 0.1 µS/cm) after the electrodeionisation unit. The water taken from the re-circulation loop was of a resistivity of 18 MΩ·cm (conductivity of 0.055 µS/cm).

The calcium concentration of the feed water was 120 ppm, which was reduced to 1.4 ppm after the reverse osmosis unit, and to <0.02 ppm after the capacitive deionisation unit. As can be seen, although the conductivity of the permeate water after the reverse osmosis is low enough to be treated by the EDI unit, the concentration of hardness forming ions in that permeate is such that precipitation would occur without further treatment. Once treated by the capacitive deionisation unit, the concentration of hardness forming calcium ions is reduced to a level that can be fed to the electrodeionisation unit without the risk of precipitation of hardness in the electrodeionisation unit.

The invention claimed is:

1. A method of providing ultrapure water from feed water containing hardness forming ions, comprising at least the steps of:
   providing a feed water stream containing hardness forming ions;
   passing the feed water stream though a pre-treatment unit to remove at least some particulate matter from the feed water and to provide a pre-treated water stream;
   passing the pre-treated water stream through a reverse osmosis (RO) unit to remove at least some ionic contamination to provide a RO permeate water stream; then
   passing the RO permeate water stream though a degassing unit to provide a degassed RO permeate stream;
   passing the degassed RO permeate water stream though a capacitive de-ionisation (CDI) unit to remove at least some of ions to provide a post-CDI stream; and then
   passing all of the post-CDI stream through an electrodeionisation (EDI) unit to remove at least some of the ions and carbon dioxide and to provide an ultrapure water stream for dispense or storage;
   wherein the ultrapure water stream from the electrodeionisation (EDI) unit is sent to a reservoir;
   passing ultrapure water in the reservoir through an UV irradiation unit, a second electrodeionisation (EDI) unit, and an ultra-filtration unit, to provide a further ultrapure water for dispense or storage in the reservoir; and
   re-circulating any water in the reservoir around a re-circulation circuit comprising, the UV irradiation unit, the second electrodeionisation unit, and the ultra-filtration unit.

2. A method as claimed in claim 1 wherein the capacitive deionisation comprises membrane capacitive deionisation.

3. A method as claimed in claim 1 further comprising one or more of the steps of:
   (i) locating a sensor prior to the capacitive deionisation, and using data from the sensor to control the voltage or current applied to the capacitive deionisation;
   (ii) locating a sensor prior to the electrodeionisation, and using data from the sensor to control the voltage or current applied to the electrodeionisation; or
   (iii) locating a sensor downstream from the capacitive deionisation, and using data from the sensor to control the voltage or current applied to the capacitive deionisation.

4. A method as claimed in claim 1 further comprising the step of discharging the capacitive deionisation into a discharge water stream passing to a discharge outlet separate from the electrodeionisation when there is no demand for the ultrapure water from the reservoir.

5. A method as claimed in claim 4 wherein the discharging time of the capacitive deionisation is <20% of the operating time of the capacitive deionisation.

6. A method as claimed in claim 4 further comprising the step of locating a sensor in the discharge outlet, and using data from the sensor to control the discharge of the capacitive deionisation.

7. A method as claimed in claim 1 to provide ultrapure water having a resistivity of >15 MΩ-cm.

8. A method of maintaining a capacitive de-ionisation (CDI) unit in a method for providing ultrapure water using reverse osmosis, capacitive deionisation, and electrodeionisation, to a downstream device, comprising at least the steps of:
  receiving a signal from the downstream device that ultrapure water is required;
  providing a feed water stream containing hardness forming ions;
  passing the feed water stream though a pre-treatment unit to remove at least some particulate matter from the feed water and to provide a pre-treated water stream;
  passing the pre-treated water stream through a reverse osmosis (RO) unit to remove at least some ionic contamination and to provide a RO permeate water stream;
  passing the RO permeate water stream though a degassing unit to provide a degassed RO permeate stream;
    passing the degassed RO permeate water stream though the CDI unit to remove at least some of the hardness forming ions by charging to provide a post-CDI stream;
  passing all of the post-CDI stream through an electrodeionisation (EDI) unit to remove at least some of the ions as removed ions, and to remove carbon dioxide, to provide an ultrapure water stream to the downstream device;
    wherein the ultrapure water stream from the electrodeionisation (EDI) unit is sent to a reservoir;
    passing ultrapure water in the reservoir through an UV irradiation unit, a second electrodeionisation (EDI) unit, and an ultra-filtration unit, to provide a further ultrapure water for dispense or storage in the reservoir; and
    re-circulating any water in the reservoir around a re-circulation circuit comprising, the UV irradiation unit, the second electrodeionisation unit, and the ultra-filtration unit;
  receiving a signal from a downstream device that purified water is no longer required:
    passing more degassed feedwater through RO unit and then the CDI unit so that the CDI unit discharges any previously removed ions in a CDI discharge stream; and
    directing the CDI discharge stream away from the EDI unit.

9. A method as claimed in claim 5 wherein the discharging time of the capacitive deionisation is 0% of the operating time of the capacitive deionisation.

10. A method as claimed in claim 7 wherein the resistivity of the ultrapure water is >18 MΩ-cm.

11. A method of providing ultrapure water from feed water containing hardness forming ions, comprising at least the steps of:
  providing a feed water stream containing hardness forming ions;
  passing the feed water stream though a pre-treatment unit to remove at least some particulate matter from the feed water and to provide a pre-treated water stream
  passing the pre-treated water stream through a reverse osmosis (RO) unit to remove at least some ionic contamination to provide a RO permeate water stream; then
  passing the RO permeate water stream though a degassing unit to provide a degassed RO permeate stream;
  passing the degassed RO permeate water stream though a capacitive de-ionisation (CDI) unit to remove at least some of ions to provide a post-CDI stream; and then
  passing the post-CDI stream through an electrodeionisation (EDI) unit, without passing the post-CDI stream through any reverse osmosis (RO) unit, to remove at least some of the ions and carbon dioxide and to provide an ultrapure water stream for dispense or storage;
  wherein the ultrapure water stream from the electrodeionisation (EDI) unit is sent to a reservoir;
  passing ultrapure water in the reservoir through an UV irradiation unit, a second electrodeionisation (EDI) unit, and an ultra-filtration unit, to provide a further ultrapure water for dispense or storage in the reservoir; and
  re-circulating any water in the reservoir around a re-circulation circuit comprising, the UV irradiation unit, the second electrodeionisation unit, and the ultra-filtration unit.

* * * * *

UNITED STATES PATENT AND TRADEMARK OFFICE
CERTIFICATE OF CORRECTION

PATENT NO. : 10,961,144 B2  
APPLICATION NO. : 16/336335  
DATED : March 30, 2021  
INVENTOR(S) : Ignazio Dentici, Michael Ball and Nigel Emery Page 1 of 1

It is certified that error appears in the above-identified patent and that said Letters Patent is hereby corrected as shown below:

In the Claims

In Column 16, Line 8, in Claim 9:  
Change -- 0% -- to -- $\leq 10\%$ --

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*